US012768950B2

(12) United States Patent
Tu et al.

(10) Patent No.: US 12,768,950 B2
(45) Date of Patent: Oct. 20, 2026

(54) ACTIVE OPTICAL SENSOR SYSTEM WITH IMPROVED EYE SAFETY

(71) Applicant: VALEO SCHALTER UND SENSOREN GMBH, Bietigheim-Bissingen (DE)

(72) Inventors: Chenji Tu, Bietigheim-Bissingen (DE); Guillaume Hamard, Prague (CZ); Jan Sedlak, Prague (CZ); Hugo Kottas, Prague (CZ); Martin Svoboda, Prague (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 472 days.

(21) Appl. No.: 18/566,452

(22) PCT Filed: May 25, 2022

(86) PCT No.: PCT/EP2022/064154

§ 371 (c)(1),
(2) Date: Dec. 1, 2023

(87) PCT Pub. No.: WO2022/253656

PCT Pub. Date: Dec. 8, 2022

(65) Prior Publication Data

US 2024/0264279 A1 Aug. 8, 2024

(30) Foreign Application Priority Data

Jun. 2, 2021 (DE) ..................... 10 2021 114 250.4

(51) Int. Cl.

| | |
|---|---|
| ***G01S 7/481*** | (2006.01) |
| ***G01S 17/931*** | (2020.01) |
| ***H02J 7/82*** | (2026.01) |

(52) U.S. Cl.
CPC .......... *G01S 7/4815* (2013.01); *G01S 17/931* (2020.01); *H02J 7/82* (2026.01)

(58) Field of Classification Search
CPC ......... G01S 7/4815; G01S 17/931; H02J 7/82
See application file for complete search history.

(56) References Cited

U.S. PATENT DOCUMENTS

| | | | | |
|---|---|---|---|---|
| 2018/0323576 | A1* | 11/2018 | Crawford | H02M 1/088 |
| 2020/0052466 | A1 | 2/2020 | Chen et al. | |
| 2020/0178361 | A1* | 6/2020 | Oka | G01S 7/4815 |

FOREIGN PATENT DOCUMENTS

| | | | |
|---|---|---|---|
| CN | 110535028 | A | 12/2019 |
| CN | 111670378 | A | 9/2020 |

(Continued)

OTHER PUBLICATIONS

International Search Report and Written Opinion in corresponding International Application No. PCT/EP2022/064154, dated Sep. 13, 2022 (12 pages).

(Continued)

*Primary Examiner* — Helal A Algahaim
*Assistant Examiner* — Evan H Haut
(74) *Attorney, Agent, or Firm* — Osha Bergman Watanabe & Burton LLP

(57) ABSTRACT

An active optical sensor system is disclosed. The active optical sensor system includes a first light emitter and a second light emitter. The active optical sensor system includes a first and second energy storage element connected to a first and second light emitter respectively. The active optical sensor system also includes control circuitry configured to selectively charge the first and second energy storage elements, and discharge the energy storage elements via the light emitters in a first and second emission period respectively. The active optical sensor system also includes a monitoring unit coupled to the energy storage elements to (Continued)

compare a value of a monitoring signal representing the electrical energy stored by the energy storage elements with a predefined threshold value and generate a failure signal depending on the comparison.

15 Claims, 3 Drawing Sheets

(56) References Cited

FOREIGN PATENT DOCUMENTS

| | | | |
|---|---|---|---|
| DE | 102008062544 | A1 | 6/2009 |
| EP | 2568547 | B1 | 4/2014 |
| WO | 2020-142947 | A1 | 7/2020 |
| WO | 2020-142949 | A1 | 7/2020 |
| WO | 2021-031753 | A1 | 2/2021 |
| WO | 2021-065097 | A1 | 4/2021 |
| WO | 2021-068212 | A1 | 4/2021 |

OTHER PUBLICATIONS

German Search Report in corresponding German Application No. 10 2021 114 250.4, dated Jan. 21, 2022 (5 pages).

Office Action issued in corresponding China Application No. 202280040145.7, dated Apr. 16, 2026. (18 pages).

* cited by examiner

ACTIVE OPTICAL SENSOR SYSTEM WITH IMPROVED EYE SAFETY

The present invention is directed to an active optical sensor system comprising a first light emitter and a second light emitter and to a corresponding method for operating an active optical sensor system.

In order to ensure eye safety and avoid severe injuries due to intense light emission, active optical sensor systems are usually required to restrict the emitted optical power to a certain range.

Document EP 2 568 547 B1 describes a driver for a laser diode, wherein the driver comprises an inductive component in a supply path for the laser diode. In this way, it is ensured that a DC forward voltage to supply the laser diode always lies below the laser threshold. Consequently, the laser diode cannot emit laser light in case it is supplied by a DC voltage. The arrangement of the inductive component ensures that laser light may be emitted during pulsed operation.

Document US 2020/0052466 A1 describes a VCSEL module, wherein an optical element is arranged in a path of an output beam. An optical detector is arranged to receive radiation that is reflected from the optical element, and a control circuit may turn off the supply current for the VCSEL in case of a failure depending on the signal of the optical detector.

However, active optical sensor systems may comprise more than one light emitter. In this case, even if eye safety requirements are met for each of the light emitters individually, failures may occur, which lead to a parallel emission of more than one light emitter. Even if the emitted optical power of each light emitter is below an allowed maximum, the total emitted optical power may exceed the maximum and cause injuries nevertheless.

It is therefore an object of the present invention to provide an improved concept for an active optical sensor system with more than one light emitter, which allows to increase eye safety.

This object is achieved by the respective subject-matter of the independent claims. Further implementations and preferred embodiments are subject-matter of the dependent claims.

The improved concept is based on the idea to monitor a total amount of electrical energy stored by two different energy storage elements, wherein for emitting light, each energy storage element may be discharged via a respective light emitter.

According to the improved concept, an active optical sensor system comprising a first light emitter and a second light emitter is provided. The sensor system comprises a first energy storage element connected to the first light emitter and a second energy storage element connected to the second light emitter. The sensor system comprises control circuitry, which is configured to selectively charge the first energy storage element and the second energy storage element. The control circuitry is configured to discharge the first energy storage element via the first light emitter to emit light during a first emission period by means of the first light emitter. The control circuitry is further configured to discharge the second energy storage element via the second light emitter to emit light during a second emission period by means of the second light emitter. The sensor system comprises a monitoring unit, which is coupled to the first energy storage element and the second energy storage element. The monitoring unit is configured to compare a value of a monitoring signal representing a total amount of electrical energy stored by the first energy storage element and the second energy storage element to a predefined threshold value and to generate a failure signal depending on a result of the comparison.

By definition, an active optical sensor system comprises a light source for emitting light or light pulses, respectively. For example, the light source may be implemented as a laser, in particular as an infrared laser. In case of the improved concept, the light source comprises the first and the second light emitter. Furthermore, an active optical sensor system by definition comprises a detection unit with at least one optical detector to detect reflected parts of the emitted light. In particular, the active optical sensor system is configured to generate one or more sensor signals based on the detected fractions of the light and process and/or output the sensor signals. For example, lidar systems represent active optical sensor systems.

The control circuitry may for example comprise a control unit and switching circuitry with a plurality of switching elements. In particular, the switching circuitry comprises a first switching element, switchably connecting the first energy storage element to a power supply terminal of the sensor system and a second switching element switchably connecting the second energy storage element to the power supply terminal. A power supply unit, which may be part of the active optical sensor system or may be provided externally to the active optical sensor system, may be connected to the power supply terminal to supply electrical energy to charge the first and the second energy storage element.

In particular, the control circuitry may control the switching circuitry to close the first switching element in order to charge the first energy storage element and to open the first switching element, when the first energy storage element is not to be charged. Analogously, the control unit may control the switching circuitry to close the second switching element in order to charge the second energy storage element by means of the power supply unit and to open the second switching element, when the second energy storage element is not to be charged. Selectively charging the first and the second energy storage element may therefore be understood such that the control unit is configured to control the switching circuitry to charge the first energy storage element and the second energy storage element independent of each other.

In particular, the first emission period and second emission period are different from each other. For example, the first and the second emission period do not overlap. In other words, in case of a failure free operation of the active optical sensor system, the second light emitter does not emit light during the first emission period and the first light emitter does not emit light during the second emission period.

The value of the monitoring signal compared to the threshold value may for example correspond to an amplitude value of the monitoring signal, in particular an absolute value of the amplitude of the monitoring signal.

An active optical sensor system according to the improved concept is configured to charge the first energy storage element and to use the electrical energy stored on the charged first energy storage element to drive the first light emitter in order to emit light during the first emission period. In the same way, the second energy storage element is charged and the electrical energy stored on the charged second energy storage element is used to drive the second light emitter in order to emit light during the second emission period.

Therefore, the total amount of electrical energy stored in the first and in the second energy storage element determines a maximum optical power that can theoretically be emitted by the first and the second light emitter. Even if, in case of a failure, both light emitters would emit light in parallel or at the same time, the emitted optical power emitted by both light emitters cannot exceed a value determined by the total electrical energy stored on the first and the second energy storage element. Therefore, by monitoring the total electrical energy stored on the first and the second energy storage element by means of comparing the monitoring signal to the threshold value, allows to determine whether the light emitters could, in principle, at a given time emit light with an optical power exceeding a certain maximum value corresponding to the threshold value for the total electrical energy.

Consequently, the failure signal may contain information regarding whether the monitoring signal exceeds the threshold value or not. In case the threshold value is exceeded, a potentially dangerous situation may occur, wherein the light emitters could emit more power than allowed. In this case, the control unit may for example disable or turn off the active optical sensor system at least in part depending on the failure signal. By adjusting the threshold value such that it corresponds to the maximum allowed optical output power, the eye safety of the active optical sensor system may be increased.

In particular, during failure free operation or a normal operation, the first and the second energy storage element are never charged at the same time. However, this does not necessarily mean that one of the energy storage elements is always in a completely discharged state and the other one is always in a completely charged state. For example, the energy storage elements may comprise one or more respective capacitors. Therefore, there is a time constant associated, which determines the actual charging status of the energy storage elements during normal operation. However, during normal operation, the threshold value is not exceeded by the total amount of energy or the monitoring signal, respectively.

According to several implementations of the active optical sensor system according to the improved concept, the control circuitry is configured to connect the first energy storage element to the power supply terminal of the sensor system, in particular by closing the first switching element, during a first charging period prior to the first emission period, in particular in order to charge the first energy storage element, and to disconnect the second energy storage element from the power supply terminal, in particular by opening the second switching element, during the first charging period. Furthermore, the control circuitry is configured to connect the second energy storage element to the power supply terminal of the sensor system, in particular by closing the second switching element, during a second charging period prior to the second emission period, in particular in order to charge the second energy storage element, and to disconnect the first energy storage element from the power supply terminal, in particular by opening the first switching element, during the second charging period.

Connecting two components to each other, in particular by closing a respective switching element, may be understood such that it includes leaving the two components connected, in particular by leaving the switching element closed. Analogously, disconnecting two components from each other, in particular, by opening a respective switching element, may be understood such that it includes leaving the components disconnected, in particular by leaving the respective switching element open.

The power supply terminal is connectable to the power supply unit. The power supply unit may be part of the optical sensor system. In other implementations, the power supply unit is not a part of the active optical sensor system.

The first and the second energy storage element may for example each be connected to a reference terminal, for example, to a ground terminal.

In particular, in case the first energy storage element comprises a first capacitor, the first capacitor may be connected between the reference terminal and the first switching element. Analogously, if the second energy storage element comprises a second capacitor, the second capacitor may be connected between the second switching element and the reference terminal.

According to several implementations, the control circuitry is configured to connect the first light emitter and the second light emitter to the reference terminal during the first emission period to discharge the first energy storage element via the first light emitter. The control circuitry is further configured to connect the first light emitter and the second light emitter to this reference terminal during the second emission period to discharge the second energy storage element via the second light emitter.

In other words, during each of the first and the second emission period, both light emitters are connected to the reference terminal. Therefore, electrical energy stored on the first energy storage element during one of the emission periods causes a current through the first light emitter which in turn causes the first light emitter to emit light. The same holds analogously for the energy stored in the second energy storage element during one of the emission periods, which causes the second light emitter to emit light.

However, in the absence of any failure, during the first emission period only the first energy storage element stores enough electrical energy to cause the first light emitter to emit light but the second energy storage element does not store enough electrical energy to cause the second light emitter to emit light. Analogously, in the absence of any failure, during the second emission period only the second energy storage element stores enough electrical energy to cause the second light emitter to emit light but the first energy storage element does not store enough electrical energy to cause the first light emitter to emit light. Consequently, for normal operation, only one of the light emitter emits light during each of the emission periods.

On the other hand, in case of a failure, the second energy storage element may be at least partially charged during the first charging period and/or the second energy storage element may be at least partially charged during the first charging period. In this case, both light emitters may emit light during the first emission period or the second emission period. This situation may be recognized by means of the monitoring unit in the described way and therefore parallel emission may be avoided.

Connecting the first and the second light emitter to the reference terminal during each of the emission periods has the advantage that only a single switching element is required for both light emitters. In this way, costs and assembly space may be saved.

In particular, a third switching element of the switching circuitry is arranged between the reference terminal and the first light emitter as well as between the reference terminal and the second light emitter. Therefore, if the third switching element is closed, the first and the second light emitter are both connected to the reference terminal and in case the third switching element is open, the first and the second light emitter are both disconnected from the reference terminal.

According to several implementations, the monitoring unit is configured to further compare a value of the monitoring signal to a predefined further threshold value and to generate a further failure signal depending on a result of the further comparison. Therein, different failure types may be represented by different threshold values.

In particular, the comparison of the value of the monitoring signal to the threshold value and the further threshold value, respectively, may be carried out at different times. For example, the monitoring signal may be time dependent.

For example, the active optical sensor system may be configured to repeatedly generate sensor signals representing the environment during a plurality of consecutive frames. Therein, the first and the second light emitter are operated analogously in each of the consecutive frames. Consequently, the monitoring signal behaves analogously in each of the consecutive frames, too.

In case of a certain failure type, the monitoring signal may for example exceed the threshold value at a certain time or during a certain time period in a given frame. Then, the comparison of the value of the monitoring system to the threshold value may for example be carried out accordingly at the respective time or time period. For another failure type, the monitoring signal may for example exceed the threshold value at different time or during a different time period in the frame. Then, the comparison of the value of the monitoring system to the further threshold value may be carried out accordingly at the respective different time or time period.

According to several implementations, the sensor system comprises a summation unit with a first input terminal coupled to the first energy storage element, a second input terminal coupled to the second energy storage element and an output terminal to provide a summed signal at the output terminal. Therein, the monitoring signal corresponds to the summed signal or depends on the summed signal. Therein, the summed signal is, in particular, an analog signal.

In a particularly simple implementation, the summation unit may for example comprise a first resistor arranged between the monitoring unit and the first energy storage element and a second resistor arranged between the monitoring unit and the second energy storage element or the summation unit may consist of the first and the second resistor.

According to several implementations, the summation unit is configured to receive a first input signal representing a first amount of electrical energy stored on the first energy storage element at the first input terminal and a second input signal representing a second amount of electrical energy stored on the second energy storage element at the second input terminal.

The input signals are, in particular, given by respective output voltages of the respective energy storage elements. The summation unit is, in particular, configured to sum up the first and the second input signal to generate the summed signal.

According to several implementations, the sensor system comprises a signal adaptation unit with an input terminal connected to the output terminal of the summation unit and an output terminal of the signal adaptation unit connected to an input terminal of the monitoring unit. The signal adaptation unit is configured to generate an adapted signal, in particular an adapted summed signal, depending on the summed signal. The monitoring signal is then given by the adapted signal or depends on the adapted signal.

Since the output voltages of the storage elements may, in order to drive the light emitters, which may for example comprise laser diodes, be significantly higher than voltages that may be handled by the monitoring unit, the signal adaptation unit may adapt the respective different voltage domains to each other. For example, while output voltages of the energy storage elements may rise up to tens of volts, the monitoring unit may be configured to operate with voltages in the order of several volts.

According to several implementations, the sensor system comprises a temperature sensor arranged and configured to generate a temperature signal depending on an operation temperature of the sensor system. The signal adaptation unit is configured to generate the adapted signal depending on the temperature signal.

In particular, the signal adaptation unit may be configured to compensate for temperature variations when translating the summed signal into the adapted signal. In this way, it may be avoided that variations in the summed signal are interpreted by the monitoring unit in a wrong way in case of temperature variations.

According to several implementations, the monitoring unit is configured to generate the monitoring signal depending on the summed signal, in particular depending on the adapted signal.

In particular, the sensor system, for example the monitoring unit, comprises an analog-to-digital-converter, which is configured to generate the monitoring signal depending on the summed signal, in particular depending on the adapted signal.

For example, the monitoring signal may correspond to a digitalized version of the adapted signal.

According to several implementations, the threshold value is greater than a value of the monitoring signal corresponding to a maximum amount of electrical energy storable by the first energy storage element and greater than a value of the monitoring signal corresponding to a maximum amount of electrical energy storable by the second energy storage element.

In other words, the threshold value cannot be exceeded if one of the first and the second energy storage element is in a completely discharged state.

According to several implementations, the first light emitter comprises a first laser diode, in particular a first infrared laser diode, and the second light emitter comprises a second laser diode, in particular a second infrared laser diode.

For example, the sensor system may be designed such that a positive voltage is supplied at the power supply terminal and the reference terminal corresponds to a ground terminal. Then, the cathodes of the laser diodes are connected to the ground terminal, and the anodes of the laser diodes are connected to the respective energy storage elements and switchably connected to the power supply terminal. In case the sensor system is designed such that a negative voltage is supplied at the power supply terminal, the polarities of the laser diodes are opposite.

A failure of one of the laser diodes may lead to an increased conductivity of the respective laser diode also in reverse direction. In other words, such a failure may be modelled by a parasitic resistor connected between the anode and the cathode of the respective laser diode. It is for example assumed that the laser diode of the second light emitter has such a failure. The first energy storage element is charged during the first charging period. However, due to the parasitic resistor across the laser diode of the second light emitter, current may flow from the first energy storage element via the first light emitter and the second light emitter to the second energy storage element and charge it at least partially. During the subsequent first emission period, the cathodes of both light laser diodes are connected to the ground terminal and, in consequence, both energy storage elements are discharged via the respective laser diodes. Thus, both laser diodes emit in parallel.

By monitoring the monitoring signal in the described way, such situations may be recognized early and, in particular, may be avoided by disabling the sensor system depending on the failure signal.

However, also other types of failures may be detected by means of the monitoring signal. For example, if there is a failure in one of the switching elements, similar effects may occur. For example, in case the first switching element connecting the first energy storage element to the power supply terminal has a failure and consequently also has a significant conductivity in the open state, the first energy storage element may be charged during the second charging period even though the first switching element is open. Also in this case, both light emitters may emit during the subsequent second emission period. Also such situations may be avoided or detected by the improved concept.

According to several implementations, the active optical sensor system comprises a detection unit, which is configured to detect reflected portions of the light emitted by the first light emitter and/or the second light emitter and to generate one or more sensor signals depending on the detected reflected portions.

According to several implementations, the sensor system is implemented as a lidar system, for example as a flash lidar system or as a laser scanner.

According to several implementations, the first light emitter is configured or arranged to emit the light during the first emission period according to a first emission direction and the second light emitter is configured or arranged to emit the light during the second emission period according to a second emission direction, which is different from the first emission direction.

According to the improved concept, also a motor vehicle comprising an active optical sensor system according to the improved concept is provided.

According to the improved concept, also a method for operating an active optical sensor system, in particular an active optical sensor system according to the improved concept, is provided. According to the method, during a first charging period, a first energy storage element of the active optical sensor system is charged. During a first emission period, in particular after the first charging period, light is emitted using a first light emitter of the sensor system by discharging the first energy storage element, in particular via the first light emitter. During a second charging period, a second energy storage element of the sensor system is charged. During a second emission period, in particular after the second charging period, light is emitted using a second light emitter of the sensor system by discharging the second energy storage element, in particular via the second light emitter. A value of a monitoring signal representing a total amount of electrical energy stored by the first energy storage element and the second energy storage element is compared to a predefined threshold value, in particular by the monitoring unit of the sensor system. A failure signal is generated depending on a result of the comparison, in particular by the monitoring unit.

According to several implementations of the method, the second emission period follows the second charging period, in particular immediately. The second charging period follows the first emission period, in particular immediately. The first emission period follows the first charging period, in particular immediately.

In particular, the first emission period and the first charging period do not overlap, the second charging period and the first emission period do not overlap and the second emission period and the second charging period do not overlap.

According to several implementations, the value of the monitoring signal is compared to the threshold value during the first emission period and/or during the second emission period.

It has been found that failures of a light emitter, in particular of a laser diode, may lead to an increase of the monitoring signal during the emission periods, which may be detected by comparison with the threshold value.

According to several implementations, the value of the monitoring signal is compared to a predefined further threshold value and a further failure signal is generated depending on a result of the comparison of the value of the monitoring signal to the further threshold value.

In particular, the value of the monitoring signal is compared to the further threshold value at a time outside of the first emission period and outside of the second emission period, in particular at a time, where neither the first nor the second light emitter emit light.

It was found that failures of switching elements may lead to an increase of the monitoring signal outside of the emission periods, which may be detected by comparing the monitoring value to the further threshold value.

According to several implementations, a failure type is determined depending on the monitoring signal, for example depending on a result of the comparison of the monitoring signal to the threshold value or the further threshold value. The failure type may be determined by the monitoring unit, in particular by a control unit of the monitoring unit or by another computing unit coupled to the monitoring unit.

Further implementations of the method according to the improved concept follow directly from the various implementations of the sensor system according to the improved concept and vice versa. In particular, an active optical sensor system according to the improved concept may be configured to carry out a method according to the improved concept or carries out such a method.

Further features of the invention are apparent from the claims, the figures and the description of figures. The features and feature combinations mentioned above in the description as well as the features and feature combinations mentioned below in the description of figures and/or shown in the figures alone may not only be encompassed by the improved concept in the respectively specified combination, but also in other combinations. Thus, implementations of the improved concept are encompassed and disclosed, which may not explicitly be shown in the figures or explained, but arise from and can be generated by separated feature combinations from the explained implementations. Implementations and feature combinations, which do not have all features of an originally formulated claim, may be encompassed by the improved concept. Moreover, implementations and feature combinations, which extend beyond or deviate from the feature combinations set out in the relations of the claims, may be encompassed by the improved concept.

In the figures:

FIG. 1 shows a motor vehicle 1 comprising an exemplary implementation of an active optical sensor system 2 according to the improved concept, which is for example implemented as a lidar system.

Figure 1:
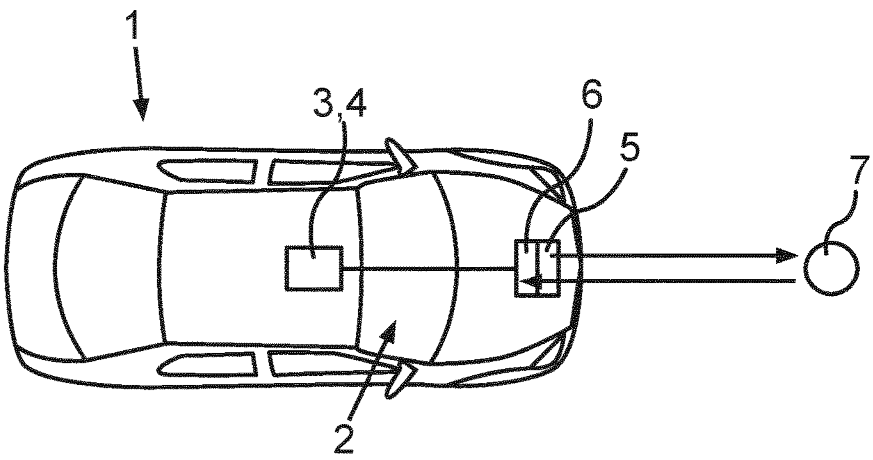
FIG. 1 shows a schematic representation of the motor vehicle with an exemplary implementation of an active optical sensor system according to the improved concept.

The sensor system 2 comprises an emitting unit 5, configured to emit light, in particular infrared light, into the environment of the vehicle 1. The sensor system 2 further comprises a detector unit 6, which may detect fractions of the emitted light, which are reflected by an external object 7 in the environment of the motor vehicle 1. Depending on the detected fractions, the detection unit 6 may generate one or more detector signals. The sensor system 2 further comprises a control unit 3, which may receive the one or more detector signals and determine for example a distance of the object 7 from the sensor system 2 or the motor vehicle 1, respectively, based on a time-of-flight measurement depending on the one or more detector signals. Furthermore, the control unit 3 may determine three-dimensional point clouds representing points in the environment of the motor vehicle 1 from which reflections of the emitted light come back to the sensor system 2 and are detected by the detection unit 6.

Figure 2:
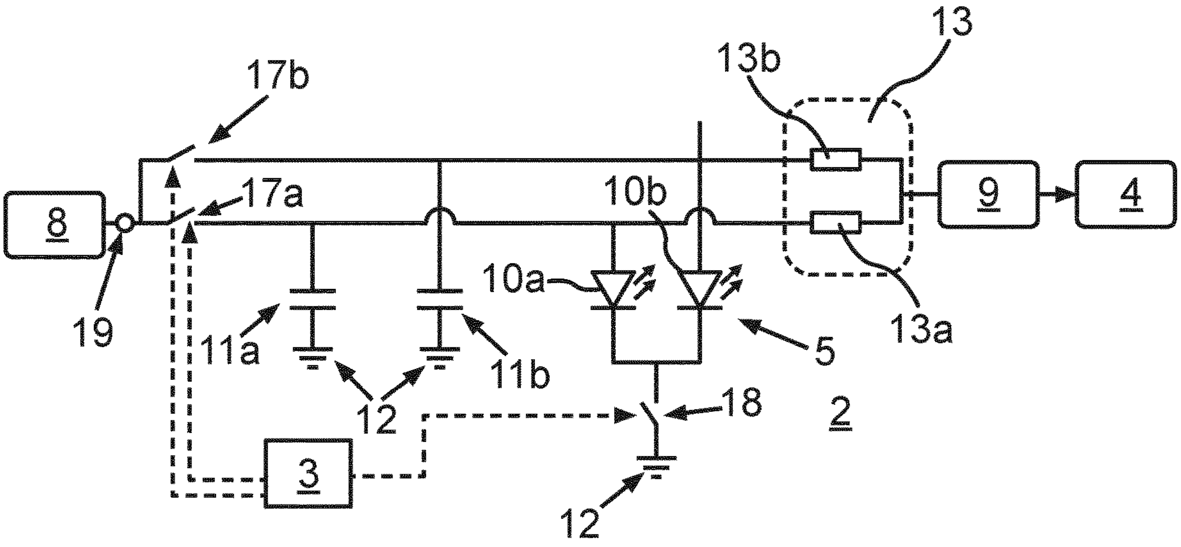
FIG. 2 shows a schematic block diagram of a further exemplary implementation of an active optical sensor system according to the improved concept.

The sensor system 2 is shown in more detail in the exemplary block diagram in FIG. 2. For the sake of clarity, the detector unit 6 is not shown in FIG. 2.

The emitting unit 5 comprises a first laser diode 10*a* and a second laser diode 10*b*, which are switchably connected with their respective anodes to a power supply terminal 19 by means of a first switch 17*a* and a second switch 17*b*, respectively. The cathodes of both laser diodes 10*a*, 10*b* are connected via a common third switch 18 to a ground terminal 12. A power supply unit 8 of the motor vehicle 1 or the sensor system 2 is connected to the power supply terminal 19 and supplies a positive voltage.

The sensor system 2 comprises a first capacitor 11*a* and a second capacitor 11*b* acting as respective energy storage elements for the laser diodes 10*a*, 10*b*. A first terminal of the first capacitor 11*a* is connected between the first switch 17*a* and the anode of the first laser diode 10*a* and a second terminal of the first capacitor 11 a is connected to the ground terminal 12. Analogously, the first terminal of the second capacitor 11*b* is connected between the second switch 17*b* and the anode of the second laser diode 10*b*, and the second terminal of the second capacitor 11*b* is connected to the ground terminal 12. The control unit 3 is coupled to the switches 17*a*, 17*b*, 18 to control them and correspondingly open or close them.

The sensor system 2 further comprises a summation unit 13, which is connected to the first terminals of the first and the second capacitor 11*a*, 11*b* at respective inputs of the summation unit 13 and is configured to generate a summed signal as an output of the summation unit 13.

The summed signal is, in particular, proportional to the sum of the voltages of the capacitors 11*a*, 11*b*, in particular when the switches 17*a* and 17*b* are open. In a particularly simple implementation, the summation unit 13 consists of a first resistor 13*a* connected between the first terminal of the first capacitor 11*a* and the output of the summation unit 13 and a second resistor 13*b* connected between the first terminal of the second capacitor 11*b* and the output of the summation unit 13. However, in more complex implementations, different designs of the summation unit 13 are possible.

The active optical sensor system 2 comprises a monitoring unit 4, which may for example be implemented on a field programmable gate array, FPGA, or another, in particular digital, processing unit. Furthermore, the sensor system 2 may comprise a signal adaptation unit 9, which is configured to adapt the summed signal and provide the adapted signal to the monitoring unit 4. Since the laser diodes 10*a*, 10*b* may operate at significantly higher voltages as the monitoring unit 4, such signal adaption may comprise a reduction of the signal level in a defined way. In particular, the adapted signal may be proportional to the summed signal. Furthermore, in some implementations, the sensor system 2 may comprise temperature sensor (not shown) arranged to determine a temperature of the sensor system 2, for example of the laser diodes 10*a*, 10*b*, and coupled to the signal adaptation unit 9. The signal adaptation unit 9 may then generate the adapted signal depending on the temperature in order to compensate for temperature variations and to allow for a consistent evaluation of the adapted signal.

The summed signal is, in particular, an analog voltage signal and consequently also the adapted signal may be an analog signal. Therefore, the monitoring unit 4 may comprise an analog-to-digital-converter, ADC, in order to generate a digitalized version of the adapted signal, which may be denoted as a monitoring signal.

The monitoring unit 4 compares the monitoring signal to one or more threshold values to determine, whether a failure of the sensor system 2 is present and, in some implementations, may also determine a type of failure.

The control unit 3 closes the first switch 17*a* during a first charging period to charge the first capacitor 11*a*. During the first charging period, the second switch 17*b* is open and also the third switch 18 is open. At the end of the first charging period, the control unit 3 opens the first switch 17*a* and closes the third switch 18 during a subsequent first emission period. Then, the energy stored in the first capacitor 11*a* discharges via the first laser diode 10*a* causing the first laser diode 10*a* to emit light. After the first emission period, the third switch 18 is opened again and during a subsequent second charging period, the second switch 17*b* is closed by the control unit 3 in order to charge the second capacitor 11*b*. After the second charging period, the control unit 3 opens the second switch 17*b* and closes the third switch 18 again during a subsequent second emission period. Now, the energy stored in the second capacitor 11*b* is discharged via the second laser diode 10*b* to cause the second laser diode 10*b* to emit light.

In normal operation, that is in absence of any failure of the sensor system 2, the first and the second laser diode 10*a*, 10*b* therefore emit light in an alternating fashion. It is noted, however, that further laser diodes (not shown) may be arranged analogously.

Since the two laser diodes 10*a*, 10*b* are both connected to the ground terminal 12 by a single switch 18 during each of the emission periods, it has to be ensured that during the first charging period only the first capacitor 11*a* is charged and during the second charging period, only the second capacitor 11*b* is charged in order to avoid parallel emission of light of both laser diodes 10*a*, 10*b*, which could lead to a total emitted optical power that is greater than an allowed maximum optical power.

During normal operation, this is ensured by switching the switches 17*a*, 17*b*, 18 in the described manner. However, in case of a failure, the capacitors 11*a*, 11*b* may be charged unintentionally, which could lead to a parallel emission of both laser diodes 10*a*, 10*b*.

Figure 3:
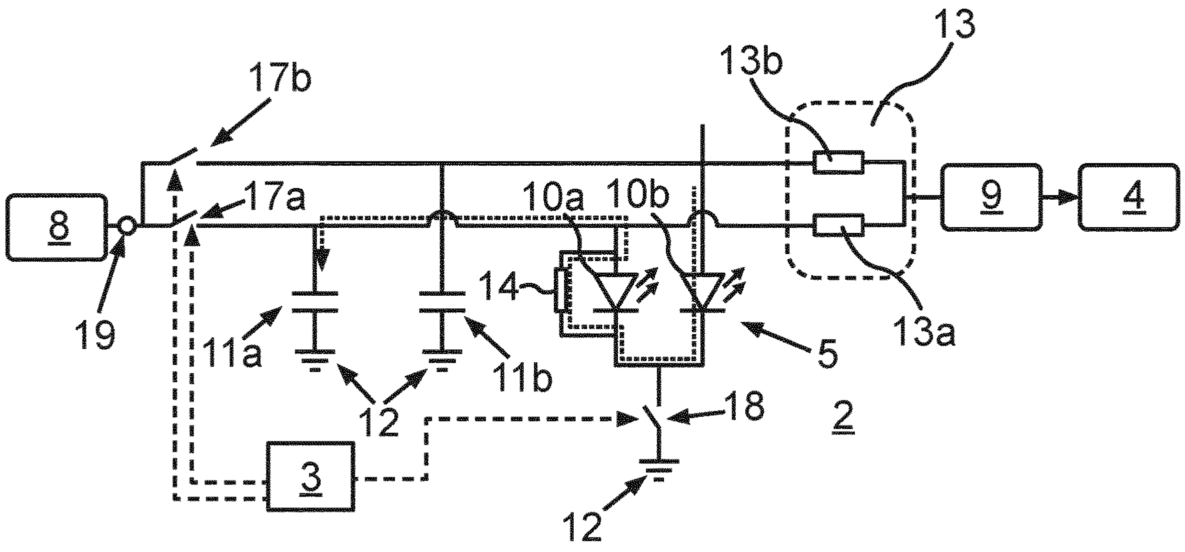
FIG. 3 shows the active optical sensor system of FIG. 2 in case of a failure of a first type.

In FIG. 3, the active optical sensor system 2 of FIG. 2 is shown in a situation, where the first laser diode 10*a* has a failure acting as a parallel parasitic resistor 14. In other words, there may be leakage current flowing in reverse direction of the first laser diode 10*a*. When the second capacitor 11*b* is charged and the voltage at the first terminal of the second capacitor 11*b* is greater than the voltage at the first terminal of the first capacitor 11*a* and in addition the switches 17*a*, 17*b*, 18 are open, a current may flow from the second capacitor 11*b* via the second laser diode 10*b* and the parasitic resistor 14 to the first capacitor 11*a* and charges it at least partially. If then the third switch 18 is closed to discharge the second capacitor 11*b* for light emission via the second laser diode 10*b*, also the first capacitor 11*a* is discharged via the first laser diode 10*a*, which may lead to parallel emission of light of both laser diodes 10*a*, 10*b*.

In order to detect such a situation, the monitoring unit 4 compares the monitoring signal to a first threshold value and generates a failure signal depending on a result of the comparison. The active optical sensor system 2 may for example be turned off or enter a failure mode depending on the failure signal, in particular if the monitoring signal exceeds the first threshold value. For example, the control unit 3 may turn off the active optical sensor system 2 or control it to enter the failure mode.

Figure 5:
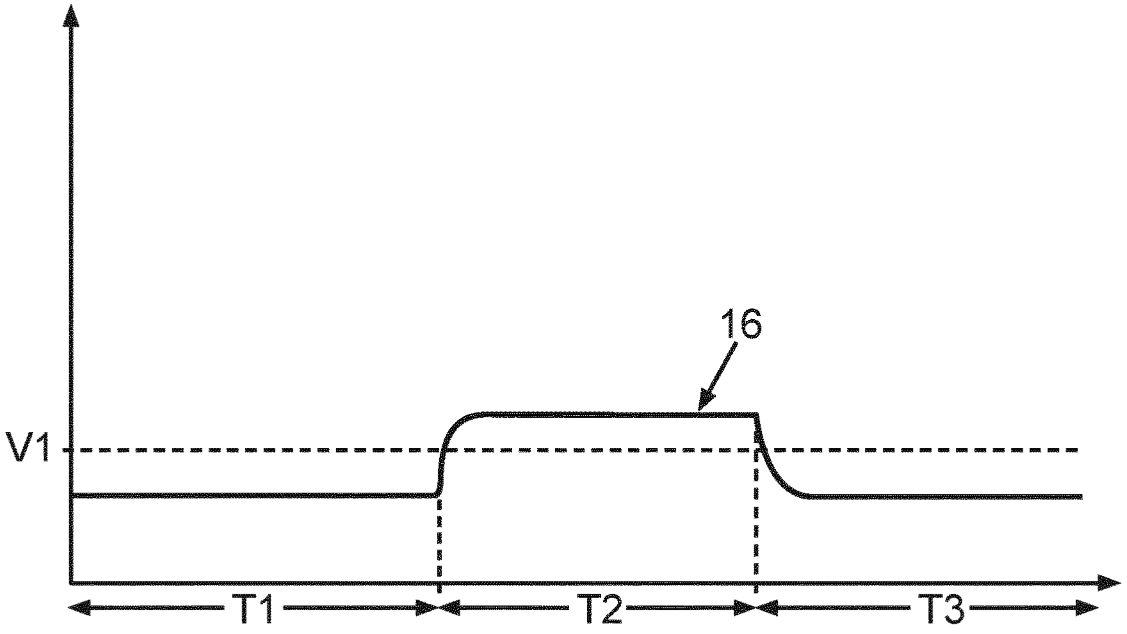
FIG. 5 shows schematically an adapted signal as a function of time.

FIG. 5 shows a schematic example for the adapted signal 16 as a function of time. It is assumed that that monitoring signal is the digital version of the adapted signal 16. During a first time period T1, there is no emission of light by either of the laser diodes 10*a*, 10*b*. The adapted signal 16 has a certain, nearly constant value, which may for example be zero or close to zero. During a subsequent second time period T2, the laser diodes 10*a*, 10*b* emit light in an alternating fashion as described. Therefore, the adapted signal 16 increases to a level, which is basically given by the time constants of the capacitors 11*a*, 11*b* and a repetition frequency for the emission periods. If the repetition period changes during the second time period T2, the value of the adapted signal 16 may also change during the second time period T2 (not shown). After the second time period T2, a third time period T3 follows, where there is again no emission of light by the laser diodes 10*a*, 10*b*.

In the example of FIG. 5, a failure as described with respect to FIG. 3 is present. Therefore, the adapted signal 16 and analogously the monitoring signal increase beyond the first threshold value V1 during the second time period T2. In this way, the monitoring unit 4 may detect the failure.

Figure 4:
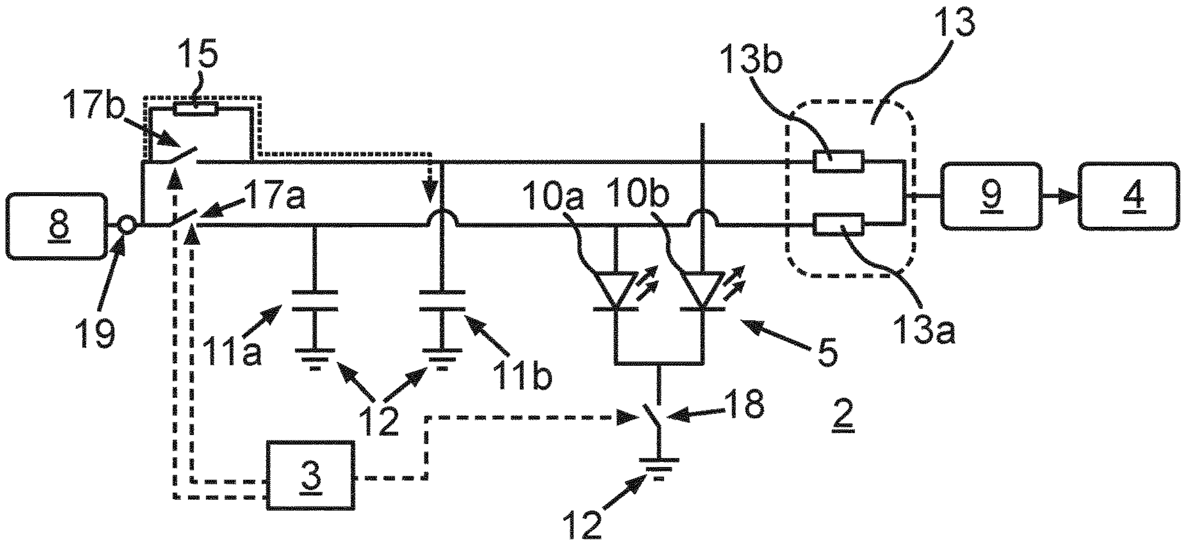
FIG. 4 shows the active optical sensor system of FIG. 2 in case of a failure of a second type.

In FIG. 4, the sensor system 2 of FIG. 2 is shown in a situation, where a different type of failure is present. For example, the second switch 17*b* has a failure acting as a parasitic resistor 15 across the second switch 17*b*. As a consequence, the second capacitor 11*b* is charged whether the second switch 17*b* is open or not. Also this may lead to a parallel emission of light during the first emission periods.

Figure 6:
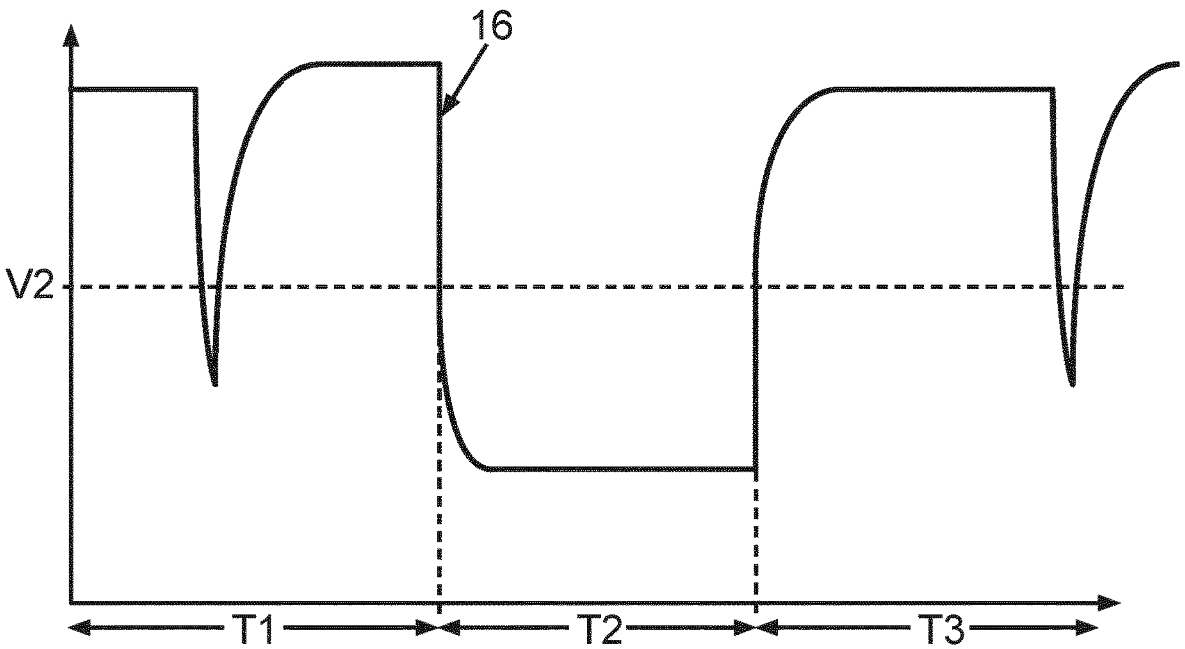
FIG. 6 shows schematically a further adapted signal as a function of time.

FIG. 6 shows a corresponding adapted signal according to such a failure type. The adapted signal 16 and consequently the monitoring signal exceeds a second threshold value V2 during the first time period T1 and the third time period T3. The monitoring unit 4 may therefore compare the monitoring signal to the second threshold value V2 to determine the respective type of failure.

As can be seen from FIG. 5 and FIG. 6, different types of failure may be visible in the adapted signal 16 and the monitoring signal during different time periods of the operation of the sensor system 2. Therefore, the monitoring unit 4 may carry out the respective comparisons at the suitable times.

As described, in particular with respect to the figures, the improved concept allows to monitor the status of the active optical sensor system to avoid parallel emission of light of two light emitters, which are intended to emit light only in an alternating fashion. Therefore, for each of the light emitters, the maximum allowed optical output power may be exploited, since the risk for parallel emission and therefore too large output power is reduced. In addition, the monitoring can be used for system diagnostic. Unintended parallel emission of light of two light emitters can compromise a measurement of the active optical system. This can result in a disturbed point cloud generated by the active optical system.

The invention claimed is:

1. An active optical sensor system comprising:

a first light emitter and a second light emitter, a first energy storage element connected to the first light emitter and a second energy storage element connected to the second light emitter;

control circuitry, which is configured to selectively charge the first energy storage element and the second energy storage element, discharge the first energy storage element via the first light emitter to emit light during a first emission period and discharge the second energy storage element via the second light emitter to emit light during a second emission period; and a monitoring unit, which is coupled to the first energy storage element and the second energy storage element and configured to compare a value of a monitoring signal representing a total amount of electrical energy stored by the first energy storage element and the second energy storage element to a predefined threshold value and to generate a failure signal depending on a result of the comparison.

2. The active optical sensor system according to claim 1, wherein the control circuitry is configured to connect the first energy storage element to a power supply terminal of the sensor system and to disconnect the second energy storage element from the power supply terminal during a first charging period prior to the first emission period; and wherein the control circuitry is further configured to connect the second energy storage element to the power supply terminal and to disconnect the first energy storage element from the power supply terminal during a second charging period prior to the second emission period.

3. The active optical sensor system according to claim 1, wherein the control circuitry is configured to connect the first light emitter and the second light emitter to a reference terminal during the first emission period to discharge the first energy storage element via the first light emitter; and wherein the control circuitry is further configured to connect the first light emitter and the second light emitter to the reference terminal during the second emission period to discharge the second energy storage element via the second light emitter.

4. The active optical sensor system according to claim 1, wherein the monitoring unit is configured to further compare the value of the monitoring signal to a predefined further threshold value and to generate a further failure signal depending on a result of the further comparison.

5. The active optical sensor system according to claim 1, wherein the sensor system comprises a summation unit with a first input terminal coupled to the first energy storage element, a second input terminal coupled to the second energy storage element, and an output terminal to provide a summed signal, and wherein the monitoring signal depends on the summed signal.

6. The active optical sensor system according to claim 5, wherein the summation unit is configured to receive a first input signal representing a first amount of electrical energy stored on the first energy storage element at the first input terminal and a second input signal representing a second amount of electrical energy stored on the second energy storage element at the second input terminal.

7. The active optical sensor system according to claim 5, further comprising: a signal adaptation unit with an input terminal connected to the output terminal of the summation unit and an output terminal connected to an input terminal of the monitoring unit, wherein the signal adaptation unit is configured to generate an adapted signal depending on the summed signal, and wherein the monitoring signal depends on the adapted signal.

8. The active optical sensor system according to claim 7, further comprising: a temperature sensor arranged and configured to generate a temperature signal depending on an operation temperature of the sensor system, wherein the signal adaptation unit is configured to generate the adapted signal depending on the temperature signal.

9. The active optical sensor system according to claim 5, wherein the monitoring unit is configured to generate the monitoring signal depending on the summed signal.

10. The active optical sensor system according to claim 5, wherein the sensor system comprises an analog-to-digital-converter, which is configured to generate the monitoring signal depending on the summed signal.

11. The active optical sensor system according to claim 1, wherein the threshold value is greater than a value of the monitoring signal corresponding to a maximum amount of electrical energy storable by the first energy storage element and greater than a value of the monitoring signal corresponding to a maximum amount of electrical energy storable by the second energy storage element.

12. The active optical sensor system according to claim 1, wherein the first light emitter comprises a first laser diode and the second light emitter comprises a second laser diode.

13. A method for operating an active optical sensor system, the method comprising:

charging a first energy storage element during a first charging period;

emitting light using a first light emitter of the sensor system during a first emission period, by discharging the first energy storage element;

charging a second energy storage element during a second charging period;

emitting light using a second light emitter of the sensor system during a second emission period, by discharging the second energy storage element;

comparing a value of a monitoring signal representing a total amount of electrical energy stored by the first and the second energy storage element to a predefined threshold value; and generating a failure signal depending on a result of the comparison.

14. The method according to claim 13, wherein a failure type is determined depending on the monitoring signal.

15. The method according to claim 13, wherein the value of the monitoring signal is compared to the threshold value during the first emission period and during the second emission period.

* * * * *